April 27, 1971     S. RUBEN     3,576,674

LEAD PEROXIDE-SULFURIC ACID CELL

Filed Oct. 21, 1969

INVENTOR
SAMUEL RUBEN

United States Patent Office 3,576,674
Patented Apr. 27, 1971

3,576,674
LEAD PEROXIDE-SULFURIC ACID CELL
Samuel Ruben, 52 Seacord Road,
New Rochelle, N.Y. 10801
Continuation-in-part of applications Ser. No. 758,274,
Sept. 9, 1968, and Ser. No. 800,078, Feb. 18, 1969.
This application Oct. 21, 1969, Ser. No. 868,133
Int. Cl. H01m 39/00
U.S. Cl. 136—26                                  8 Claims

ABSTRACT OF THE DISCLOSURE

The invention is a lead peroxide-sulfuric acid cell in which the positive electrode comprises titanium nitride having a thin film of a nonpolarizing material and coated with a mixture of lead peroxide containing a small fractional part of lead phosphate. The negative electrode comprises an active porous lead surface. The electrolyte is sulfuric acid, which may be gelled.

---

Figure 1:
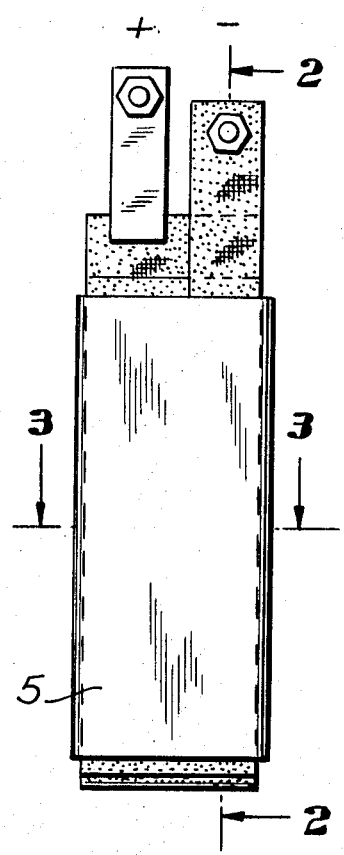

This invention relates to a lead peroxide-sulfuric acid storage battery employing a thin light weight positive electrode. The battery has a higher output per pound than storage batteries of this type heretofore used or developed. The reduction in weight is accomplished by substituting for one or both of the commonly used lead grids which support the active materials, a grid of titanium nitride, the positive electrode having a surface layer of non-polarizing material, such as a flash of gold.

The present application is a continuation in part of my co-pending applications Ser. No. 758,274, now U.S. Patent 3,486,940, filed Sept. 9, 1968 entitled, "Storage Battery Having a Positive Electrode Comprising a Supporting Base of Titanium Nitride Having a Surface Film of Non-Polarizing Material" and Ser. No. 800,078, now abandoned, filed Feb. 18, 1969 entitled, "Electric Current Producing Cell."

In patent application Ser. No. 758,274, I describe a lead sulfuric acid storage battery in which the positive electrode comprises a base of titanium nitride having a flash surface of gold, coated with lead peroxide and having an electrolyte of sulfuric acid. Patent application Ser. No. 800,078 describes a similar type of battery in which the electrolyte is gelled by the addition of submicron size "fumed" silica.

I have found that the cyclic life of the batteries described in my above mentioned two co-pending patent applications may be materially increased by changing the composition of the oxide coating on the positive electrode. Instead of utilizing a coating of lead peroxide, I form a coating consisting of a mixture of lead peroxide and a small fractional part of lead phosphate. This is conveniently accomplished by adding phosphoric acid to the pasting mixture. In making the positive electrode the perforated or expanded titanium sheet is nitrided at 1100° C. for 1 hour in a pure nitrogen atmosphere. After nitriding, the plates are vacuum vapor coated with a thin gold deposit. The thin gold coating may also be produced by electrodeposition. However, I have found that the gold film produced by vacuum vapor deposit is superior to that produced by electrodeposition in that the former provides a continuous uniform gold film somewhat similar in appearance to thin gold foil whereas the surface of the electrodeposited coating exhibits a crystal grain boundary with the possibility of a non-continuous coating. The amount of gold used in the vapor method deposition is also much less. The vapor deposited gold uniformly coats all areas, it is strongly adherent and does not flake off or detach itself from the nitride base during the large density changes that take place in the lead peroxide coating in its cycle from $PbO_2$ to $PbSO_4$. In the manufacture of the cell, the gold surfaced positive plates are pasted with a composition consisting of 20 grams of 80 parts 75 PbO/25 Pb and 20 parts $Pb_3O_4$ ground in a mortar and pestle with 3 ml. 6% $H_3PO_4$. After mixing, 1.0 ml. $H_2SO_4$ S.G. 1.400 is added and the mixture further ground to a spreadable consistency. Both sides of the plate are coated with this mixture. This coating is allowed to air dry for 24 hours, reacting to a hard mass, then wetted with $H_2SO_4$ S.G. 1.400 until fully absorbed, drained, and allowed to dry and react for 48 hours.

The reaction of the lead oxide with the phosphoric acid and the sulfuric acid in the production of the paste, results in a mixture of lead ortho phosphate and lead sulfate. The treatment after hardening (24 hours later) with 1.400 $H_2SO_4$ completes conversion of lead oxide to lead sulfate of unreacted component. Electroforming to the peroxide stage in the 1.07 S.G. $H_2SO_4$ containing 1% by volume of phosphoric acid, is completed in 48 hours, with the phosphoric acid maintaining the lead phosphate content.

I have found that this lead phosphate content is an important factor in providing several times the life capacity of the positive electrode and mechanically producing a lead peroxide that locks in better with the perforations of the nitride base. The oxide stays hard instead of becoming softened and pasty with loss of mass and capacity and is bonded to the base.

The negative electrode of the battery may utilize a base of corrugated copper screen. Following a bright dip, the corrugated copper screen is lead plated at the rate of 0.75 amp. for 10 minutes at room temperature in a solution of lead sulfamate. The plating solution is made by dissolving 5.0 grams of sulfamic acid powder in 100.0 ml. of $H_2O$, then reacting to neutrality with lead carbonate. The lead sulfamate solution is filtered and to provide a better plating, conditioning agents added; namely, 0.07 gram of beta naphthol and 0.70 gram of Aloin. The screen, plated with 0.5 gram of lead, is then coated with the same pasting mix as that applied to the positive nitrided electrode.

While the low density base of nitride titanium metal is preferred for continuous operation due to its high resistance to chemical effects with sulfuric acid and the importance of a non-polarizing layer such as a vapor produced thin gold surface, an unnitrided titanium base may, for some applications, be used with lead peroxide coated phosphate electrode. For example, for use in a reserve cell where the electrolyte is added just prior to operation of the cell, the plates can be perforated or expanded titanium metal that is vapor gold flashed. On a six sq. in. surface a gold vapor coating of 15 milligrams is adequate.

Other non-polarizing coatings as described in my prior and co-pending application such as vapor deposited lead, antimony or submicron sized graphite in an acid resistant binder can be used.

The titanium nitride plaques for supporting the lead peroxide coating can be thin in the order of .010 inch expanded to a pattern having diamond shape perforations with a long axis of .077 and a short axis of .046". The expanding process greatly stiffens the metal and increases the strand thickness to .015. This provides a low weight and highly conductive base for active materials thereafter applied. The depth of the nitriding obtained when the expanded titanium is subjected to pure nitrogen atmosphere at 1100° C. is dependent upon the time and temperature. On analysis, the electrode will show a pure titanium nitride surface gradually decreasing in depth. The expanded metal plates are corrugated before nitriding to increase the amount of the peroxide coating, the corrugations being in the order of 7 per inch with a 50 mil depth. The connecting tabs are spot welded to the expanded plaque.

Another form of positive plate utilizes a perforated construction. A multiplicity of small holes of approximately 0.200" diameter are pierced in a 0.005" titanium sheet in such a manner as to produce jagged edges on the back of the plate for retention of the coating mixture. These plates are subsequently nitrided in the manner described above.

The invention described herein is applicable to both the wet electrolyte and the gelled electrolyte cells described in my above mentioned pending applications.

Figure 2:
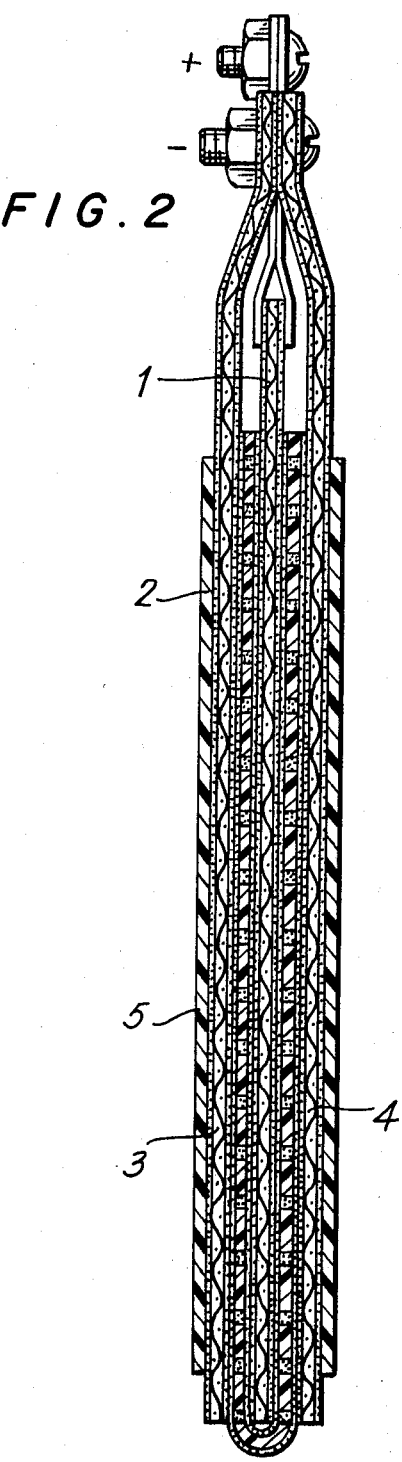
Figure 3:
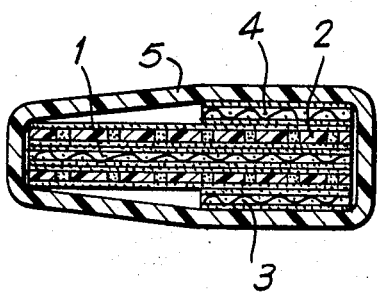

The drawings illustrate a battery structure utilizing a gelled electrolyte composed of 100.0 ml. of $H_2SO_4$ S.G. 1.220 plus 1.0 ml. of $H_3PO_4$ (85%) plus 13.0 grams of fumed silica (Cab-O-Sil). The silica and acids are mixed until a smooth spreading gel is obtained. In FIGS. 1, 2 and 3, the positive electrode 1 is a gold flashed titanium nitride plate having a multiplicity of perforations produced by piercing through the plate so as to leave jagged edges for retention of the chemically pasted lead peroxide. Spacer-electrolyte member 2 is composed of two sheets of perforated polyethylene filled with the gelled electrolyte. Negative electrodes 3 and 4 comprise lead plated copper screens impregnated and coated with lead. Surrounding shrunken polyvinyl chloride sleeve 5 holds the assembly firmly in place. External leads from the elements may be composed of titanium nitride for minimum external corrosion effects. The bolts, nuts, washers, posts, etc., used in making connection and fastening to the circuit cables may also be composed of titanium nitride.

I claim:

1. A storage battery having a positive electrode comprising a supporting base of titanium nitride having a non-polarizing film thereon, a coating on said film comprising the reaction product of lead oxide, sulfuric acid and phosphoric acid, a negative electrode comprising lead and an electrolyte of sulfuric acid.

2. The battery described in claim 1 characterized in that the no-polarizing film is a film of gold.

3. The battery described in claim 1 characterized in that the electrolyte also contains a minor amount of phosphoric acid.

4. A storage battery having a positive electrode comprising a supporting base of titanium nitride having a non-polarizing film thereon, a coating on said film comprising the reaction product of lead monoxide and lead, sulfuric acid and phosphoric acid, a negative electrode comprising lead and an electrolyte of sulfuric acid.

5. A positive electrode for lead peroxide-sulfuric acid batteries comprising an active cathode reactant coating on a gold surfaced titanium metal base, said coating comprising the reaction product of a mixture of one of the compositions (1) lead oxide and lead and (2) lead oxide, and sulfuric acid containing a minor amount of phosphoric acid.

6. A positive electrode for lead peroxide-sulfuric acid batteries comprising a base of titanium nitride having thereover a thin film of a non-polarizing material selected from the group consisting of gold, lead, antimony and carbon, and a coating thereover of lead peroxide and lead phosphate.

7. A positive electrode for lead peroxide-sulfuric acid batteries comprising a base of titanium nitride having on its surface a continuous thin non-porous film of vapor deposited gold and a coating thereover comprising the reaction product of lead monoxide, sulfuric acid and phosphoric acid.

8. A positive electrode for lead peroxide-sulfuric acid batteries comprising a base of titanium nitride having thereover a thin film of gold and a hard adherent bonded coating reacted on said base and integral therewith comprising lead oxide and lead phosphate.

References Cited

UNITED STATES PATENTS

| | | | |
|---|---|---|---|
| 625,287 | 5/1892 | Brault | 136—26 |
| 1,748,485 | 2/1930 | Kugel | 136—154 |
| 2,035,315 | 3/1936 | Harner et al. | 136—26 |
| 2,472,379 | 6/1949 | Lawson | 136—154 |
| 2,631,115 | 3/1953 | Fox | 136—138 |
| 2,856,446 | 10/1958 | McCallum | 136—26 |
| 3,486,940 | 12/1969 | Ruben | 136—26 |
| 3,499,795 | 3/1970 | Ruben | 136—24 |

WINSTON A. DOUGLAS, Primary Examiner

A. SKAPARS, Assistant Examiner

U.S. Cl. X.R.

136—64